United States Patent
Lin et al.

(10) Patent No.: US 10,291,346 B2
(45) Date of Patent: May 14, 2019

(54) BIDIRECTIONAL COMMUNICATION MODULE

(71) Applicant: Finisar Corporation, Sunnyvale, CA (US)

(72) Inventors: Leo Yu-Yu Lin, Shanghai (CN); Huade Shu, Shanghai (CN); Huiping Li, Shanghai (CN); Li Zhang, Shanghai (CN); Shanshan Zeng, Shanghai (CN); Guangsheng Li, Shanghai (CN)

(73) Assignee: FINISAR CORPORATION, Sunnyvale, CA (US)

( * ) Notice: Subject to any disclaimer, the term of this patent is extended or adjusted under 35 U.S.C. 154(b) by 12 days.

(21) Appl. No.: 15/465,443

(22) Filed: Mar. 21, 2017

(65) Prior Publication Data

US 2017/0279554 A1  Sep. 28, 2017

Related U.S. Application Data

(60) Provisional application No. 62/311,782, filed on Mar. 22, 2016.

(51) Int. Cl.
*H04J 14/00* (2006.01)
*H04J 14/02* (2006.01)
(Continued)

(52) U.S. Cl.
CPC ........ *H04J 14/021* (2013.01); *H04B 10/2503* (2013.01); *H04B 10/50* (2013.01);
(Continued)

(58) Field of Classification Search
CPC ........ H04J 14/02; H04J 14/021; H04B 10/40; H04B 10/50; H04B 10/60; H04B 10/506; H04B 10/2503
(Continued)

(56) References Cited

U.S. PATENT DOCUMENTS 6,567,198 B1 * 5/2003 Kang ............... H04B 10/506
398/192
2003/0180045 A1 * 9/2003 Tajima ............. H04B 10/2503
398/42
(Continued)

FOREIGN PATENT DOCUMENTS

EP  1235370 A2  8/2002
EP  2573961 A1  3/2013

OTHER PUBLICATIONS

International search report and written opinion dated Jun. 23, 2017 in related PCT Application PCT/US2017/023658 (13 pages).

*Primary Examiner* — Hanh Phan
(74) *Attorney, Agent, or Firm* — Maschoff Brennan

(57) ABSTRACT

In an example, a communication module includes an optical transmitter, an optical receiver, and a periodical filter. The optical transmitter is configured to emit an outbound optical signal. The optical receiver is configured to receive an inbound optical signal. A first frequency of the outbound optical signal is offset from a second frequency of the inbound optical signal by an amount less than a channel spacing of a multiplexer/demultiplexer implemented in an optical communication system that includes the communication module. The periodical filter is positioned in optical paths of both the outbound optical signal and the inbound optical signal and has a transmission spectrum with periodic transmission peaks and troughs. The first frequency of the outbound optical signal may be aligned to one of the transmission peaks and the second frequency of the inbound optical signal may be aligned to one of the transmission troughs, or vice versa.

22 Claims, 10 Drawing Sheets

(51) Int. Cl.
*H04B 10/25* (2013.01)
*H04B 10/50* (2013.01)
*H04B 10/60* (2013.01)

(52) U.S. Cl.
CPC .............. *H04B 10/60* (2013.01); *H04J 14/02* (2013.01); *H04J 14/0265* (2013.01); *H04J 14/0279* (2013.01)

(58) Field of Classification Search
USPC ......... 398/79, 135, 136, 137, 138, 139, 158, 398/159, 33, 38, 192, 193, 194, 71, 72, 398/68, 85, 87; 385/24, 37, 89, 90, 92, 385/93
See application file for complete search history.

(56) References Cited

U.S. PATENT DOCUMENTS

| | | | | |
|---|---|---|---|---|
| 2005/0047785 | A1* | 3/2005 | Hwang | G02B 6/4246 398/72 |
| 2007/0154216 | A1* | 7/2007 | Kim | H04J 14/02 398/71 |
| 2007/0280695 | A1* | 12/2007 | Li | H04B 10/506 398/135 |
| 2012/0087666 | A1* | 4/2012 | Kwon | H04J 14/0221 398/79 |

\* cited by examiner

BIDIRECTIONAL COMMUNICATION MODULE

CROSS-REFERENCE TO RELATED APPLICATION

This application claims the benefit of and priority to U.S. Provisional App. No. 62/311,782, filed Mar. 22, 2016, which is incorporated herein by reference in its entirety.

FIELD

The embodiments discussed herein are related to bidirectional (bi-di) communication modules and systems.

BACKGROUND

Unless otherwise indicated herein, the materials described herein are not prior art to the claims in the present application and are not admitted to be prior art by inclusion in this section.

Some optical communication systems implement wavelength division multiplexing (WDM) in which multiple optical signals on distinct wavelength/frequency channels are transmitted over the same optical fiber. One WDM architecture is a 2-fiber WDM ring in which a first set of multiple optical signals traveling in one direction, arbitrarily referred to herein as eastbound optical signals, are transmitted over one optical fiber, and a second set of multiple optical signals traveling in an opposite direction, arbitrarily referred to herein as westbound optical signals, are transmitted over a different optical fiber. A corresponding multiplexer at an input to each optical fiber spatially combines the eastbound or westbound optical signals from different communication modules into a corresponding one of the optical fibers. A corresponding demultiplexer at an output of each optical fiber spatially separates the eastbound or westbound optical signals and distributes individual optical signals to different communication modules.

Some WDM architectures assign the various eastbound/westbound optical signals to the ITU-T C-band and/or the ITU-T L-band, each of which can accommodate 50 channels at 100 gigahertz (GHz) channel spacing. Some legacy WDM architectures have 100 GHz multiplexers and/or demultiplexers. Assuming 40 westbound optical signals and 40 eastbound optical signals in the 2-fiber WDM ring architecture described above, the use of different optical fibers for eastbound versus westbound optical signals means frequency channels can be re-used across the optical fibers as long as each frequency channel is only used once per optical fiber such that all 80 eastbound and westbound optical signals can be accommodated in the C-band. However, the 2-fiber WDM ring architecture requires two separate optical fibers.

Other WDM architectures can be implemented with a single bidirectional optical fiber. For instance, if the channel spacing is reduced to 50 GHz, all 80 eastbound/westbound optical signals can be accommodated in the C-band on a single bidirectional optical fiber. Such a configuration requires a 50 GHz multiplexer/demultiplexer at each end of the bidirectional optical fiber, which may be more costly than 100 GHz multiplexers/demultiplexers.

Alternatively, the channel spacing for 80 total eastbound/westbound optical signals in a single bidirectional optical fiber can be kept at 100 GHz if channel assignments are extended into the L-band in addition to the C-band. Such an architecture may require a more extensive and/or expensive inventory of communication modules compared to WDM architectures with channel assignments confined to the C-band.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some example embodiments described herein generally relate to bi-di communication modules and systems.

In an example embodiment, a communication module includes an optical transmitter, an optical receiver, and a periodical filter. The optical transmitter is configured to emit an outbound optical signal. The optical receiver is configured to receive an inbound optical signal. A first frequency of the outbound optical signal is offset from a second frequency of the inbound optical signal by an amount less than a channel spacing of a multiplexer/demultiplexer implemented in an optical communication system that includes the communication module. The periodical filter is positioned in optical paths of both the outbound optical signal and the inbound optical signal and has a transmission spectrum with periodic transmission peaks and troughs. The first frequency of the outbound optical signal may be aligned to one of the transmission peaks and the second frequency of the inbound optical signal may be aligned to one of the transmission troughs, or vice versa.

In another example embodiment, a system includes a local multiplexer/demultiplexer, multiple local bidirectional communication modules, a wavelength monitor, and a centralized controller. The local multiplexer/demultiplexer includes a fiber-side port and multiple module-side ports. The fiber-side port is configured to be communicatively coupled to one end of an optical fiber having a remote multiplexer/demultiplexer at an other end of the optical fiber. The local bidirectional communication modules are coupled to the module-side ports of the local multiplexer/demultiplexer. Each of the local bidirectional communication modules is configured to: transmit a corresponding outbound optical signal on a corresponding channel within a corresponding transmission peak of a transmission spectrum of the local multiplexer-demultiplexer; and receive a corresponding inbound optical signal on a corresponding channel within the same corresponding transmission peak of the transmission spectrum as the corresponding outbound optical signal. The wavelength monitor is communicatively coupled to the optical fiber and is configured to monitor wavelengths of at least one of the inbound optical signals or the outbound optical signals. The centralized controller is coupled to the wavelength monitor, the local bidirectional communication modules, and multiple remote bidirectional communication modules coupled to module-side ports of the remote multiplexer/demultiplexer. The centralized controller is configured, based on wavelength monitor information from the wavelength monitor, to control central wavelengths of at least one of the inbound optical signals or the outbound optical signals Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only typical embodiments of the disclosure and are therefore not to be considered limiting of its scope. The disclosure will be described and explained with additional specificity and detail through the use of the accompanying drawings in which.

DETAILED DESCRIPTION OF SOME EXAMPLE EMBODIMENTS

Figure 1:
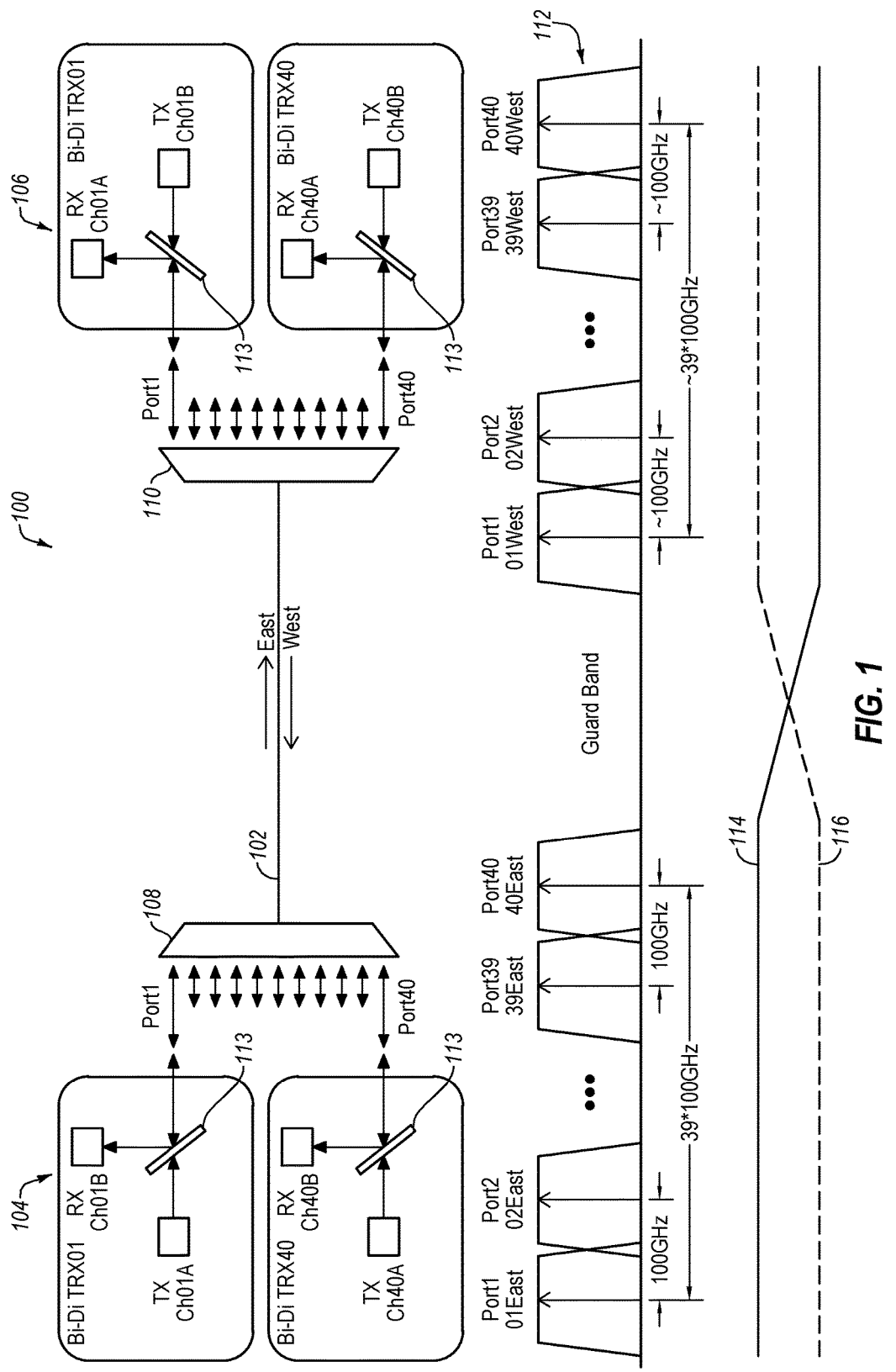
FIG. 1 illustrates an example optical communication system that implements WDM to communicate multiple optical signals bidirectionally across an optical fiber between multiple communication modules.

FIG. 1 illustrates an example optical communication system 100 (hereinafter "system 100") that implements wavelength division multiplexing (WDM) to communicate multiple optical signals bidirectionally across an optical fiber 102 between multiple communication modules 104, 106. In FIG. 1 and other figures herein, a direction from left to right through the optical fiber 102 is arbitrarily referred to as east, while a direction from right to left through the optical fiber 102 is arbitrarily referred to as west. East and west as used herein do not necessarily refer to cardinal directions but instead are a convenient shorthand to designate relative directions and/or orientation of components relative to each other.

In the example of FIG. 1, the system 100 includes 40 communication modules 104, 106 at each of two ends of the optical fiber 102. In particular, in the example of FIG. 1, the system 100 includes 40 communication modules 104 at a west end of the optical fiber 102 and 40 communication modules 106 at the east end of the optical fiber 102. In other examples, the system 100 may include some other number of communication modules 104, 106 at each of the two ends of the optical fiber 102.

At each end of the optical fiber 102, a first and last of the communication modules 104 and 106 (e.g., communication module 1 and communication module 40) are depicted and respectively labeled "Bi-Di TRX01" and "Bi-Di TRX40". Due to space constraints in the drawings, communication modules 2-39 are not illustrated at either end of the optical fiber 102.

In an example embodiment, each communication module 104, 106 includes a transmitter configured to emit an optical signal that is representative of an electrical signal received from a host device at a designated frequency (and wavelength) that is different than a designated frequency (and wavelength) of other optical signals emitted by transmitters of other communication modules 104, 106 in the system 100. The various designated frequencies (and corresponding wavelengths) may be referred to as channels. Each communication module additionally includes a receiver configured to receive an optical signal in a particular one of the channels.

In FIG. 1 and other Figures herein, each transmitter is labeled "TX" and each receiver is labeled "RX". The channel assignments for each transmitter and receiver may be labeled according to the format "ChXXY", where "XX" is a placeholder for a number of the communication module 104, 106 in which the transmitter or receiver is included (e.g., "01" for the first communication module 104, 106 or "40" for the last communication module 104, 106) and "Y" is a placeholder for the transmission direction of the channel (e.g., "A" for eastbound optical signals or "B" for westbound optical signals). Thus, the transmitter in the first communication module 104 at the west end of the optical fiber 102 is labeled "TX Ch01A" where TX designates the component as a transmitter and "Ch01A" designates the particular channel "Ch" assignment for the transmitter of the first communication module "01" transmitting in the eastbound direction "A". The above naming convention may analogously be applied to other channel assignments for other transmitters and receivers in the system 100.

The system 100 additionally includes an optical multiplexer/demultiplexer (Mux/Demux) 108, 110 at each end of the optical fiber 102 between the corresponding end of the optical fiber 102 and the corresponding communication modules 104 or 106. In an example embodiment, each of the Mux/Demux 108, 110 may include a 100 gigahertz (GHz) Mux/Demux.

In the example of FIG. 1, each Mux/Demux 108, 110 includes 40 module-side ports and a single fiber-side port.

More generally, each Mux/Demux 108, 110 may include two or more module-side ports, the specific number of module-side ports depending on the number of communication modules 104, 106 and/or the number of channels in the system 100.

In operation, the left Mux/Demux 108 is configured to receive 40 eastbound optical signals on its 40 module-side ports from the 40 left communication modules 104 and to spatially combine (e.g., multiplex) the 40 eastbound optical signals for output through its fiber-side port to the optical fiber 102. The 40 spatially combined eastbound optical signals are transmitted eastward through the optical fiber 102 to the right Mux/Demux 110. The right Mux/Demux 110 is configured to receive the 40 spatially combined eastbound optical signals from the optical fiber 102 through its fiber-side port and to spatially separate (e.g., demultiplex) out the individual 40 eastbound optical signals. The 40 eastbound optical signals are output through the 40 module side ports of the right Mux/Demux 110 such that each of the 40 eastbound optical signals is provided to a different one of the 40 right communication modules 106.

Analogously, the right Mux/Demux 110 is configured to receive 40 westbound optical signals on its 40 module-side ports from the 40 right communication modules 106 and to spatially combine (e.g., multiplex) the 40 westbound optical signals for output through its fiber-side port to the optical fiber 102. The 40 spatially combined westbound optical signals are transmitted westward through the optical fiber 102 to the left Mux/Demux 108. The left Mux/Demux 108 is configured to receive the 40 spatially combined westbound optical signals from the optical fiber 102 through its fiber-side port and to spatially separate (e.g., demultiplex) out the individual 40 westbound optical signals. The 40 westbound optical signals are output through the 40 module side ports of the left Mux/Demux 102 such that each of the 40 westbound optical signals is provided to a different one of the 40 left communication modules 104.

The foregoing example assumes that the left communication modules 104 include a total of 40 modules, the right communication modules 106 include a total of 40 modules, and each of the left Mux/Demux 108 and the right Mux/Demux 110 includes 40 fiber-side ports. Embodiments described herein can analogously be applied to other systems that may have a different number of communication modules at opposite ends of an optical fiber where a Mux/Demux at each end of the optical fiber may have a different number of fiber-side ports.

FIG. 1 additionally includes a transmission spectrum 112 of each Mux/Demux 108, 110 along with port and channel assignments in the system 100. Each eastbound channel is assigned to a different port of each Mux/Demux 108, 110 and to a different transmission peak of the transmission spectrum 112 than other eastbound channels. For instance, eastbound channels 01East, 02East, . . . , 39East, and 40East are respectively assigned to ports Port1, Port2, . . . , Port39, and Port40 and to different transmission peaks of the transmission spectrum 112 where the transmission peaks have a center-to-center spacing of 100 GHz in one or more embodiments. Similarly, westbound channels 01West, 02West, . . . , 39West, and 40West are respectively assigned to ports Port1, Port2, . . . , Port39, and Port40 and to different transmission peaks of the transmission spectrum 112 where the transmission peaks have a center-to-center spacing of 100 GHz in one or more embodiments, or around 100 GHz if we use cyclic AWG.

The relationship between the channel assignment naming convention used in connection with the naming of the transmitters and receivers as described above and the channel assignments in the transmission spectrum 112 is straightforward. For instance, TX Ch01A transmits eastbound channel 01East, whereas TX Ch10B transmits westbound channel 01West. Analogously, TX Ch40A transmits eastbound channel 04East, whereas TX Ch40B transmits westbound channel 04West. The "ChXXY" naming convention is thus essentially equivalent to the "XXEast" and "XXWest" naming convention discussed in connection with the transmission spectrum 112.

From FIG. 1 and the foregoing description, it is apparent that two channels are assigned to each port of each Mux/Demux 108, 110, where one of the two channels assigned to each port is an eastbound channel and the other is a westbound channel. It can also be seen from FIG. 1 that a guard band of unused channels may be provided between eastbound channels and the westbound channels.

Thus, the left Mux/Demux 108 is configured to receive an eastbound optical signal n (where n is an index from 1-40) emitted by a transmitter n (e.g., TX Ch01A to TX Ch40A) on channel n (e.g., Ch01A to Ch40A which correspond to 01East to 40East) of communication module n of the communication modules 104 on module-side port n and to spatially combine all n eastbound optical signals for output to the optical fiber 102 for eastward transmission to the right Mux/Demux 110. The right Mux/Demux 110 receives and spatially separates the n eastbound optical signals and outputs each eastbound optical signal n on module-side port n to be received by right communication module n of the communication modules 106.

Similarly, the right Mux/Demux 110 is configured to receive a westbound optical signal n emitted by a transmitter n (e.g., TX Ch10B to TX Ch40B) on channel n (e.g., Ch10B to Ch40B which correspond to 01West to 40West) of communication module n of the communication modules 106 on module-side port n and to spatially combine all n westbound optical signals for output to the optical fiber 102 for westward transmission to the left Mux/Demux 108. The left Mux/Demux 108 receives and spatially separates the n westbound optical signals and outputs each westbound optical signal n on module-side port n to be received by left communication module n of the communication modules 104.

Each communication module 104, 106 in the system 100 may include a single input/output port through which an outbound optical signal generated by the transmitter of the communication module 104, 106 is output, and also through which an inbound optical signal received from the corresponding Mux/Demux 108, 110 may be received. In these and other embodiments, each communication module 104, 106 may include a wideband filter 113 configured to pass the outbound signal and reflect the inbound signal, or vice versa.

In an example embodiment, each wideband filter 113 in the left communication modules 104 may have a transmission spectrum 114. The transmission spectrum 114 is designed to be aligned to the transmission spectrum 112 of each Mux/Demux 108, 110 in FIG. 1. Further, each wideband filter 113 in the right communication modules 106 may have a transmission spectrum 116. The transmission spectrum 116 is also designed to be aligned to the transmission spectrum 112 of each Mux/Demux 108, 110 in FIG. 1.

As illustrated by the transmission spectra 112 and 114, each wideband filter 113 in the left communication modules 104 may include a lowpass filter configured to pass all the eastbound signals on eastbound channels 1 to 40 (e.g., 01East to 40East) and to reflect all the westbound channels on westbound channels 1 to 40 (e.g., 01West to 40West). For instance, the wideband filter 113 in left communication module 1 of the communication modules 104 may be configured to pass the optical signal emitted by the transmitter TX Ch01A on eastbound channel 01East so that it may be input to the left Mux/Demux 108 through its module-side port 1 and to reflect the optical signal received from the left Mux/Demux 108 through its module-side port 1 on westbound channel 01West to be received by receiver RX Ch01B.

As further illustrated by the transmission spectra 112 and 116, each wideband filter 113 in the right communication modules 106 may include a highpass filter designed to pass all the westbound signals on westbound channels 1 to 40 (e.g., 01West to 40West) and to reflect all the eastbound channels on eastbound channels 1 to 40 (e.g., 01East to 40East). For instance, the wideband filter in right communication module 1 of the communication modules 106 may be designed to pass the optical signal emitted by the transmitter TX Ch01B on westbound channel 01West so that it may be input to the right Mux/Demux 110 through its module-side port 1 and to reflect the optical signal received from the right Mux/Demux 110 through its module-side port 1 on eastbound channel 01East to be received by receiver RX Ch01A.

In an example embodiment of FIG. 1, the eastbound channels may include 40 channels with 100 GHz spacing in the ITU-T C-band (e.g., 1530-1565 nanometers (nm)) while the westbound channels may include 40 channels with 100 GHz spacing in the ITU-T L-band (e.g., 1568-1610 nm). The 80 total eastbound and westbound channels at 100 GHz spacing with an extra wavelength gap ("Guard band" in FIG. 1) to separate the eastbound and westbound channels cannot fit in the C-band or the L-band alone.

Figure 2:
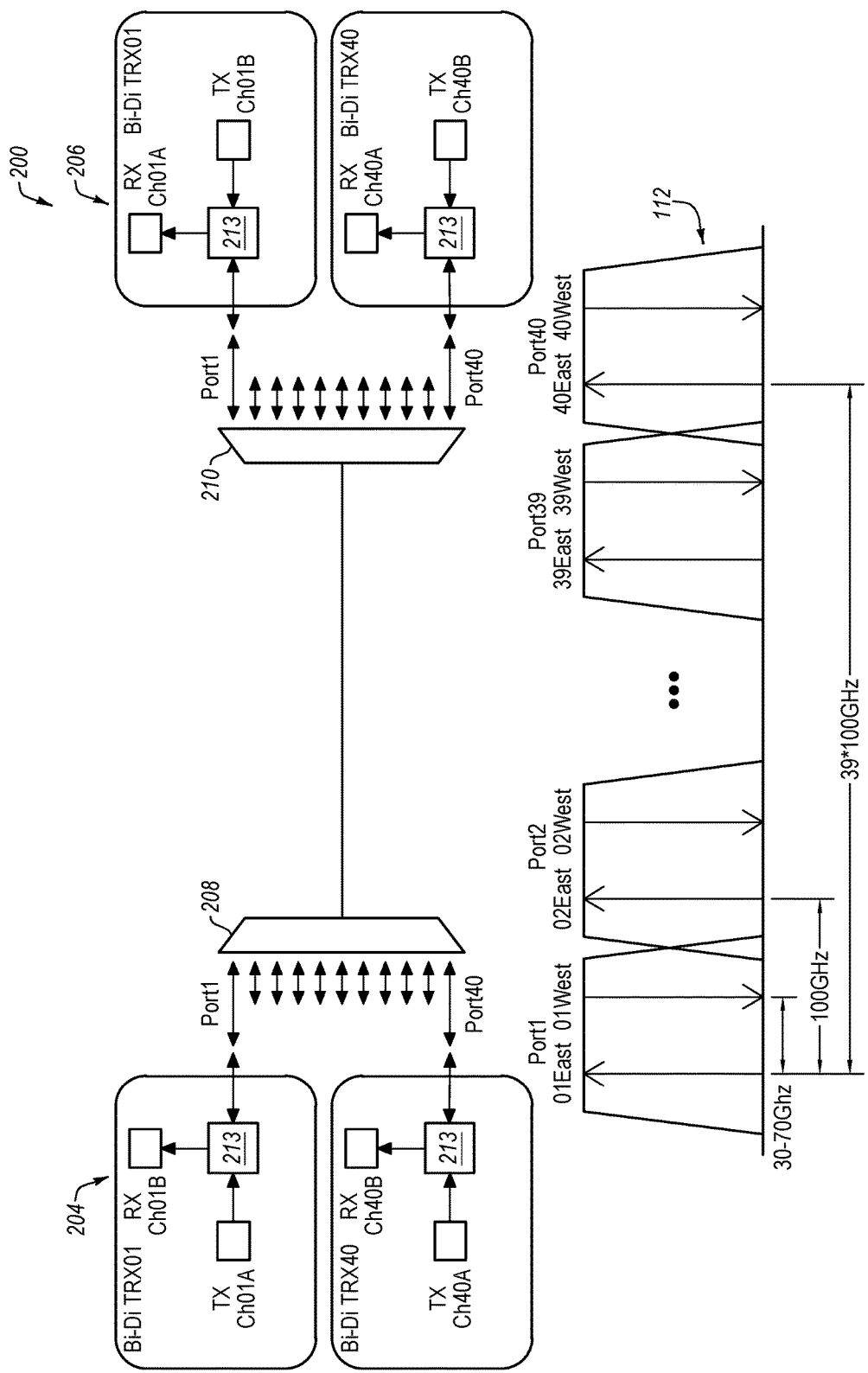
FIG. 2 illustrates another example optical communication system, arranged in accordance with at least one embodiment described herein.

FIG. 2 illustrates another example optical communication system 200 (hereinafter "system 200"), arranged in accordance with at least one embodiment described herein. Similar to the system 100, the system 200 may include a left and right Mux/Demux 208, 210 communicatively coupled by an optical fiber 202, with left communication modules 204 and right modules communications 206. Each Mux/Demux 208, 210 in FIG. 2 may be the same as or similar to the Mux/Demux 108, 110 of FIG. 1 and/or may include a 100 GHz Mux/Demux. Alternatively or additionally, each Mux/Demux 208, 210 may include a cyclic arrayed waveguide grating (AWG), a common AWG, a thin-film filter (TFF), or other suitable Mux/Demux. As in FIG. 1, in FIG. 2 only some of the communication modules 204, 206 are depicted due to space constraints. Alternatively or additionally, the left communication modules 204 may include 40 modules and the right communication modules 206 may include 40 modules.

In the system 100 of FIG. 1, each of the 80 total communication modules includes a wideband filter 113 to pass a corresponding outbound optical signal emitted by a corresponding transmitter and reflect a corresponding inbound optical signal toward a corresponding receiver. In comparison, in the system 200 of FIG. 2, each communication module 204, 206 may include a bi-di mux/demux 213 with a narrowband cyclic or periodical filter to accomplish an analogous function. The configuration of FIG. 2 may accommodate a higher channel density that allows all 80 channels (assuming 40 left communication modules 204 and 40 right communication modules 206) to be implemented in the C-band without requiring any changes to either of the two Mux/Demux units 208, 210 in the system 200.

In more detail, FIG. 2 additionally includes the transmission spectrum 112 of each Mux/Demux 208, 210 along with port and channel assignments in the system 100. Similar to FIG. 1, in FIG. 2, each eastbound channel is assigned to a different port of each Mux/Demux and different transmission peak of the transmission spectrum 112 than other eastbound channels, while each westbound channel is assigned to a different port of each Mux/Demux and different transmission peak of the transmission spectrum 112 than other westbound channels. However, in FIG. 2, each eastbound channel is paired with a corresponding westbound channel where the two channels in each pair may be spaced by tens of GHz, and both the eastbound channel and the westbound channel are not only assigned to the same port (as in FIG. 1), but are also assigned to the same transmission peak of the transmission spectrum 112. In FIG. 2, the eastbound channels may have about 100 GHz spacing between adjacent eastbound channels, while the westbound channels may also have about 100 GHz spacing between adjacent westbound channels. The spacing between the eastbound and westbound channel in each pair can be 50 GHz, or generally somewhere between 30 GHz and 70 GHz. More generally, assuming the transmission spectrum 112 of each Mux/Demux 208, 210 has transmission peaks with a center-to-center spacing between adjacent transmission peaks of $\Delta$ GHz, the spacing between the eastbound and westbound channel in each pair can be $0.5*\Delta$ GHz or in a range from $0.3*\Delta$ GHz to $0.7*\Delta$ GHz.

By pairing the eastbound and westbound channels together at tens of GHz spacing between the two channels of the pair, all 80 channels of FIG. 2 can be accommodated in the C-band without replacing legacy components such as each of the 100 GHz Mux/Demux units 208, 210 in this example. In FIG. 2, each eastbound channel in a pair is illustrated as being at a frequency tens of GHz lower than the westbound channel in the pair. In other embodiments, the arrangement is reversed with each westbound channel in the pair being at a frequency tens of GHz lower than the eastbound channel in the pair.

Figure 3:
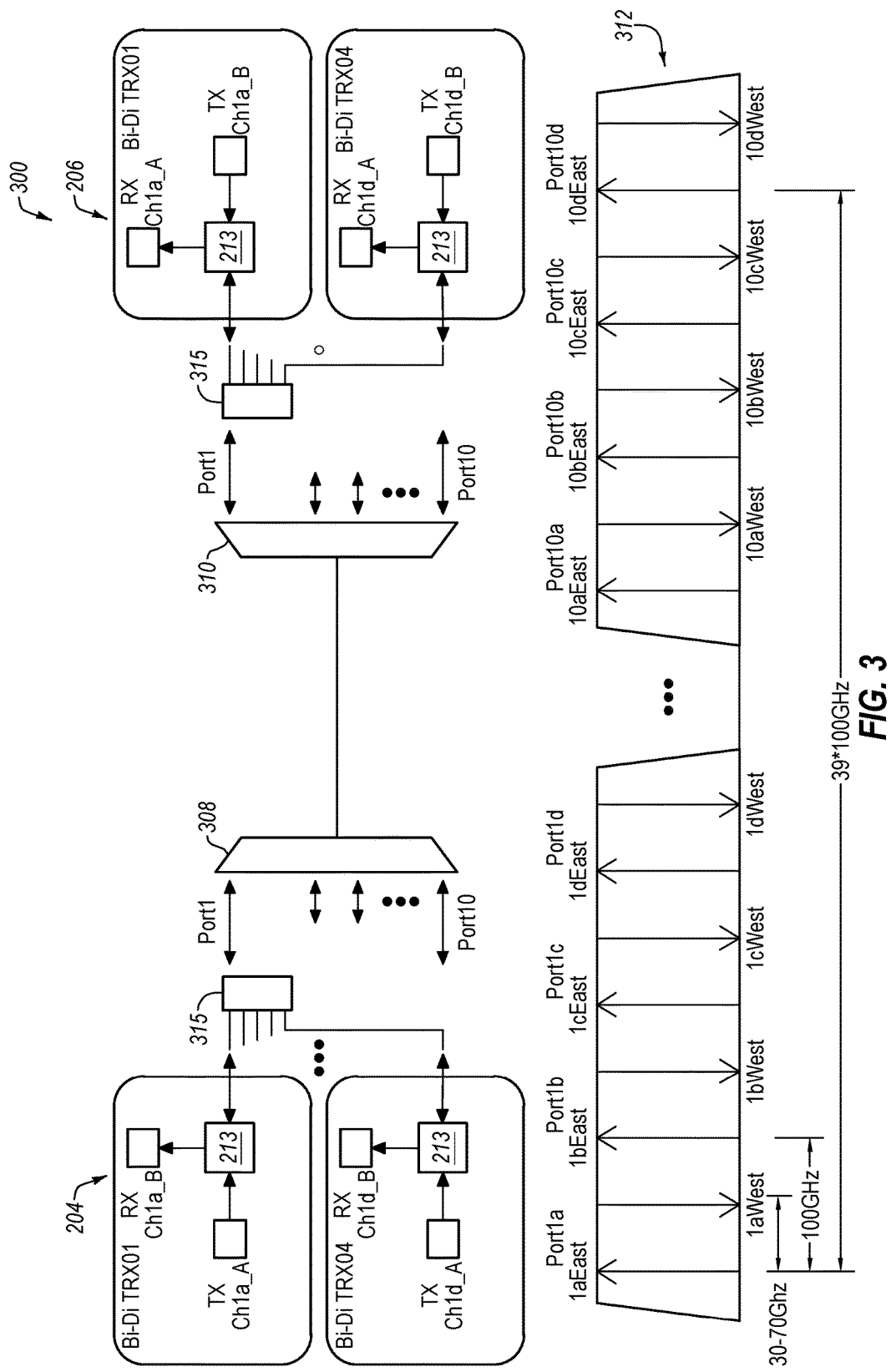
FIG. 3 illustrates another example optical communication system, arranged in accordance with at least one embodiment described herein.

FIG. 3 illustrates another example optical communication system 300 (hereinafter "system 300"), arranged in accordance with at least one embodiment described herein. The system 300 is similar in some respects to the system 200 of FIG. 2, except that in the system 300, each of a left and right Mux/Demux 308, 310 may include a 400 GHz or coarse wavelength division multiplexing (CWDM) Mux/Demux instead of the example 100 GHz Mux/Demux 208, 210 discussed in the example of FIG. 2.

Each of the communication modules 204, 206 in the system 300 may include the bi-di mux/demux 213 with a narrowband cyclic or periodical filter, as discussed with respect to FIG. 2. Additional details regarding example bi-di mux/demux units that may be implemented in the communication modules 204, 206 of FIGS. 2 and 3 are described in more detail with respect to, e.g., FIGS. 6-9.

Each of the left and right Mux/Demux 308, 310 of FIG. 3 includes a transmission spectrum 312 with, e.g., about 400 GHz channels or about 800 GHz channels. In the example of FIG. 3, multiple eastbound channels and multiple westbound channels may be assigned to the same module-side port of the Mux/Demux 308, 310 in an alternating arrangement where each pair of adjacent channels is separated by tens of GHz. For instance, in the example of FIG. 3, each Mux/Demux 308, 310 includes ten ports (e.g., "Port 1", . . . , "Port10") with four eastbound channels and four westbound channels assigned to each port (e.g., "1aEast", "1aWest", "1bEast", "1bWest", "1cEast", "1cWest", "1dEast", and "1dWest" are all assigned to port 1). The eastbound and westbound channels may be arranged in pairs (as described with respect to FIG. 2), where each pair is referred to as a subport, including for port 1, subports "Port1a", "Port1b", "Port1c", and "Port1d". Each subport in the example of FIG. 3 may be associated with a different communication module 204, 206 such that each port may be associated with as many communication modules as the port has subports.

The system 300 may additionally include a beam splitter 315 for each module-side port of each Mux/Demux 308, 310 between the corresponding port and the communication modules 204, 206 associated with that port. In FIG. 3, a single beam splitter 315 is illustrated at each end of the optical fiber 202 for simplicity with the understanding that at each end of the optical fiber 202, the system 300 may include as many beam splitters 315 as ports (e.g., a different beam splitter 315 coupled to each port) of the corresponding Mux/Demux 308, 310. Each beam splitter 315 may limit exchange of optical signals between each communication module 204, 206 and the corresponding Mux/Demux 308, 310 to the corresponding pair of eastbound and westbound channels, or the corresponding subport, associated with each communication module 204, 206. As such, each beam splitter 315 may include a 100 GHz Mux/Demux or other suitable optical device in this example.

Figure 4:
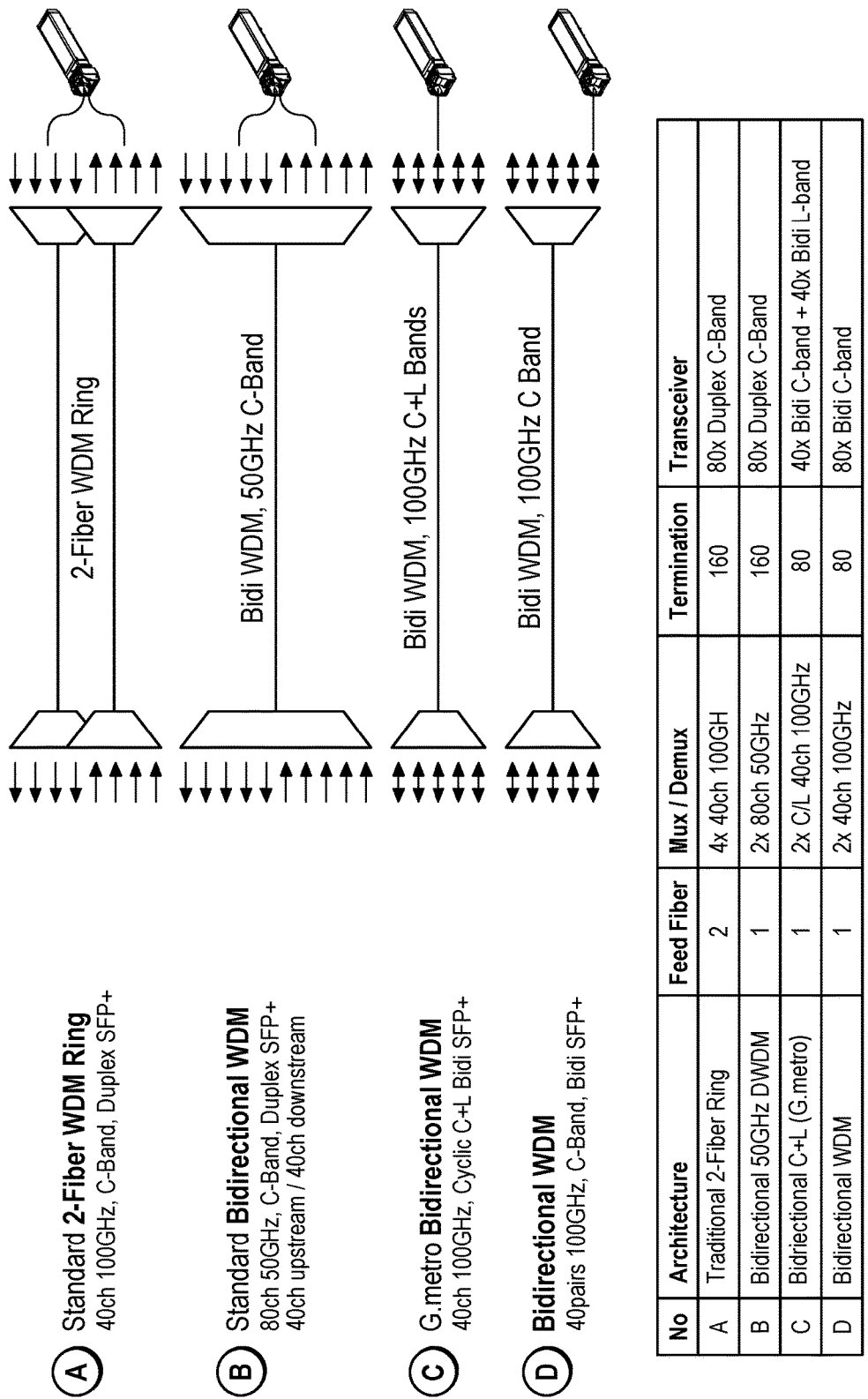
FIG. 4 summarizes and depicts four different optical communication systems A, B, C, and D that implement WDM, arranged in accordance with at least one embodiment described.

FIG. 4 summarizes and depicts four different optical communication systems (hereinafter "system" or "systems') A, B, C, and D that implement WDM, arranged in accordance with at least one embodiment described herein. FIG. 4 additionally includes a table summarizing various parameters associated with each of the systems A-D. The system 100 of FIG. 1 is an example implementation of the system C in FIG. 4. The system 200, 300 of FIG. 2 or 3 is each individually an example implementation of the System D in FIG. 4. Other systems described in subsequent Figures are also examples of the System D in FIG. 4.

Figure 5:
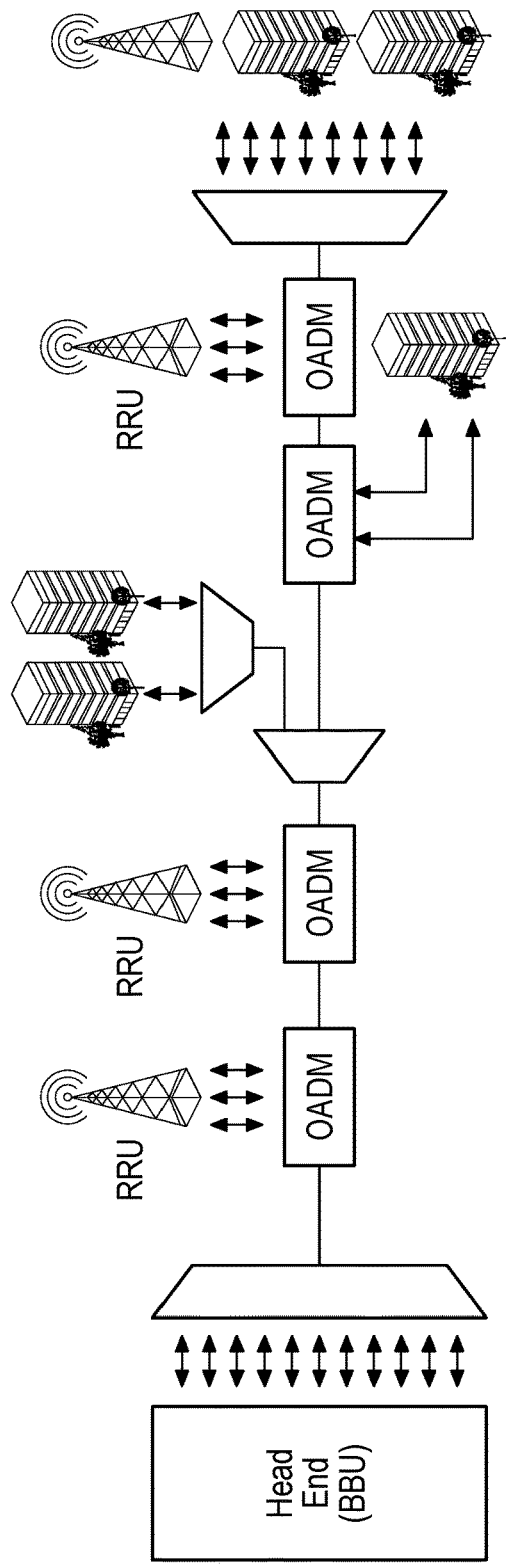
FIG. 5 illustrates another example optical communication system, arranged in accordance with at least one embodiment described herein.

As suggested by FIG. 4, embodiments of system D may have a lower cost than the systems A-C since the system D can be implemented with one feed fiber, and fewer terminations. Embodiments of the system D may also use existing low cost 100 GHz mux/demux units without the need for C+L band cyclic AWG and L-band modules. Alternatively or additionally, embodiments of the system D of FIG. 4 may enable flexible architectures that allow any combinations of optical add drop multiplexers (OADMs), multiplexers (Mux), and demultiplexers (Demux) without being limited by available 50 GHz mux/demux or C+L cyclic AWG. In addition, the system D can fit more channels, e.g., into standard C-band, as compared to the system C, as there's no need to reserve wavelength gap. An example of such an architecture that may be enabled by embodiments of the system D is illustrated in FIG. 5. In FIG. 5, "RRU" stands for remote radio unit and "BBU" stands for base band unit.

Embodiments of the bi-di mux/demux that may be implemented in each of the communication modules 204, 206 of the system 200, 300, or of the system D of FIGS. 2-4 may have any of a variety of configurations and/or may include a fixed or tunable cyclic or periodical filter. Various example configurations of a bi-di mux/demux are illustrated and described in more detail below.

Figure 6:
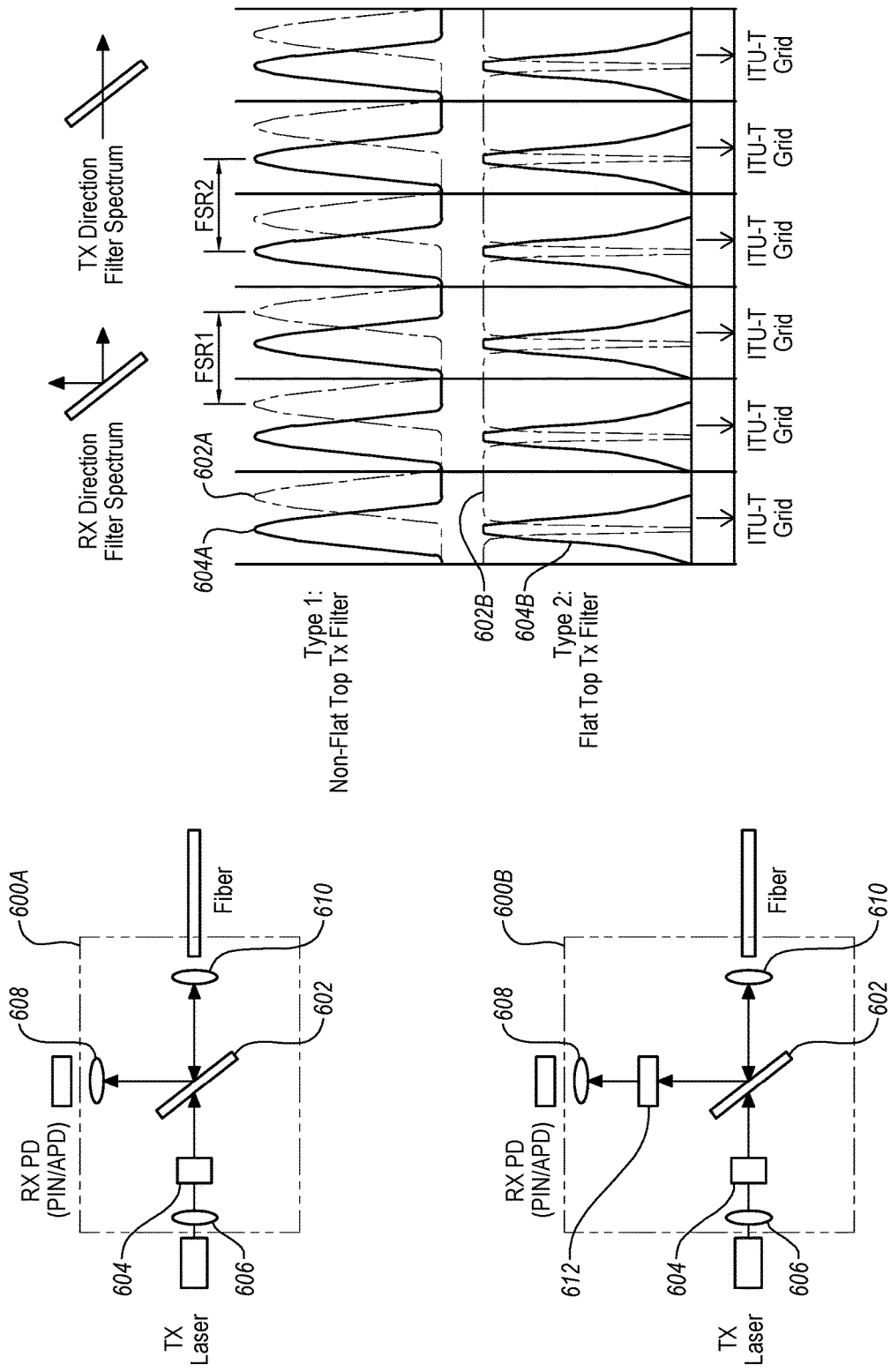
FIG. 6 illustrates two example bi-di mux/demux units such as may be implemented in the optical communication systems of FIGS. 2 and 3, arranged in accordance with at least one embodiment described herein.

For instance, FIG. 6 illustrates two example bi-di mux/demux units 600A, 600B such as may be implemented in the system D, the system 200, the system 300, and/or other systems described herein, arranged in accordance with at least one embodiment described herein. In each of the bi-di mux/demux units 600A, 600B, components of the bi-di mux/demux unit 600A or 600B are surrounded by a dashed outline, and other components of the corresponding communication module or corresponding system are depicted outside the outline for context. The components external to the bi-di mux/demux units 600A, 600B include a transmitter (TX laser), a receiver (RX PD), and a fiber. Other bi-di mux/demux units described herein are similalry depicted in relation to a transmitter, a receiver, and a fiber for context, and the description of such components will not be repeated except as needed to describe operation of the corresponding bi-di mux/demux units.

Each of the bi-di mux units 600A, 600B includes a first filter 602 arranged at any suitable angle, such as 45 degrees to the fiber, and an optical isolator 604 positioned between the transmitter and the first filter 602. Each bi-di mux unit 600A, 600B additionally includes a first lens 606 positioned between the transmitter and the optical isolator 604, a second lens 608 positioned between the receiver and the first filter 602, and a third lens 610 positioned between the first filter 602 and the fiber. The first lens 606 between the transmitter and the optical isolator 604 may be configured to collimate an outbound optical signal emitted by the transmitter. The second lens 608 between the receiver and the first filter 602 may be configured to focus an inbound optical signal onto the receiver. The third lens 610 may be configured to focus the outbound optical signal received from the transmitter (through the first lens 606, the optical isolator 604, and the first filter 602) into the fiber. The third lens 610 may also be configured to collimate the inbound optical signal received from the fiber, which collimated inbound optical signal is directed to the first filter 602, which redirects the collimated inbound optical signal to the receiver through the second lens 608 and through a second filter 612 in the bi-di mux/demux unit 600B. Other bi-di mux/demux units described herein may similarly include first, second, and third lenses and an optical isolator and the description of such components will not be repeated except as needed to describe operation of the corresponding bi-di mux/demux units. The bi-di mux/demux unit 600B additionally includes the second filter 612 between the first filter 602 and the receiver, and more particularly between the first filter 602 and the second lens 608.

The first filter 602 in each of the bi-di mux/demux units 600A, 600B may include a non-flat top transmission spectrum 602A. Alternatively, the first filter 602 in each of the bi-di mux/demux units 600A, 600B may include a flat-top transmission spectrum 602B. In the graphs that include the transmission spectra 602A and 602B, vertical lines delimit boundaries of 100 GHz channels in, e.g., the ITU-T C-band grid with respect to the transmission spectra 602A, 602B.

As illustrated in FIG. 6, each of the transmission spectra 602A and 602B may include a first free spectral range (FSR1) of 100 GHz, or some other FSR1. In some embodiments, the outbound optical signal emitted by each of the transmitters in FIG. 6 may be at a channel positioned or aligned to a transmission peak of the transmission spectrum 602A or 602B so that the outbound optical signal may pass through the first filter 602. In comparison, the inbound optical signal may be at a channel positioned or aligned to a trough of the transmission spectrum 602A or 602B so that the inbound optical signal may be reflected by the first filter 602 toward the receiver.

The second filter 612 in the bi-di mux/demux unit 600B may include a transmission spectrum 604A when the first filter 602 includes the non-flat top transmission spectrum 602A. Alternatively or additionally, the second filter 612 in the bi-di mux/demux unit 600B may include a transmission spectrum 604B when the first filter 602 includes the flat-top transmission spectrum 602B. Each of the transmission spectra 604A and 604B may include a second free spectral range (FSR2) of 100 GHz, or some other FSR2. In some embodiments, the inbound optical signal received by the bi-di mux/demux unit 600B may be at a channel aligned to a transmission peak of the transmission spectrum 604A or 604B so that the inbound optical signal may pass through the second filter 612 to reach the receiver.

The first filter 602 in the bi-di mux/demux unit 600A may include a fixed (e.g., non-tunable) filter. The first and second filter 602, 612 in the bi-di mux/demux unit 600B may also each include a fixed filter. In other embodiments, one or both of the first and second filter 602, 612 may include a tunable filter, as described in more detail below.

Figure 7:
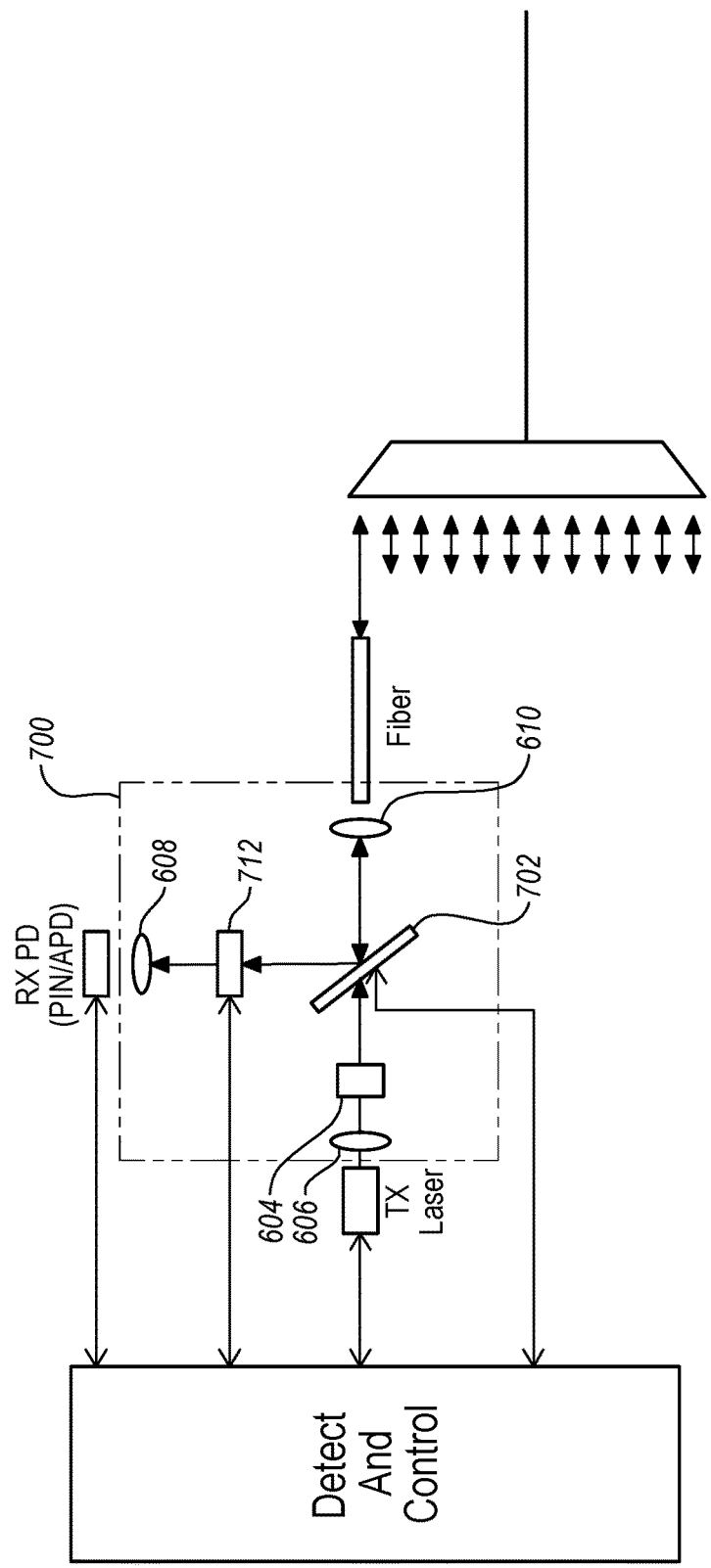
FIG. 7 illustrates another example bi-di mux/demux unit such as may be implemented in the optical communication systems of FIGS. 2 and 3, arranged in accordance with at least one embodiment described herein.
Figure 8:
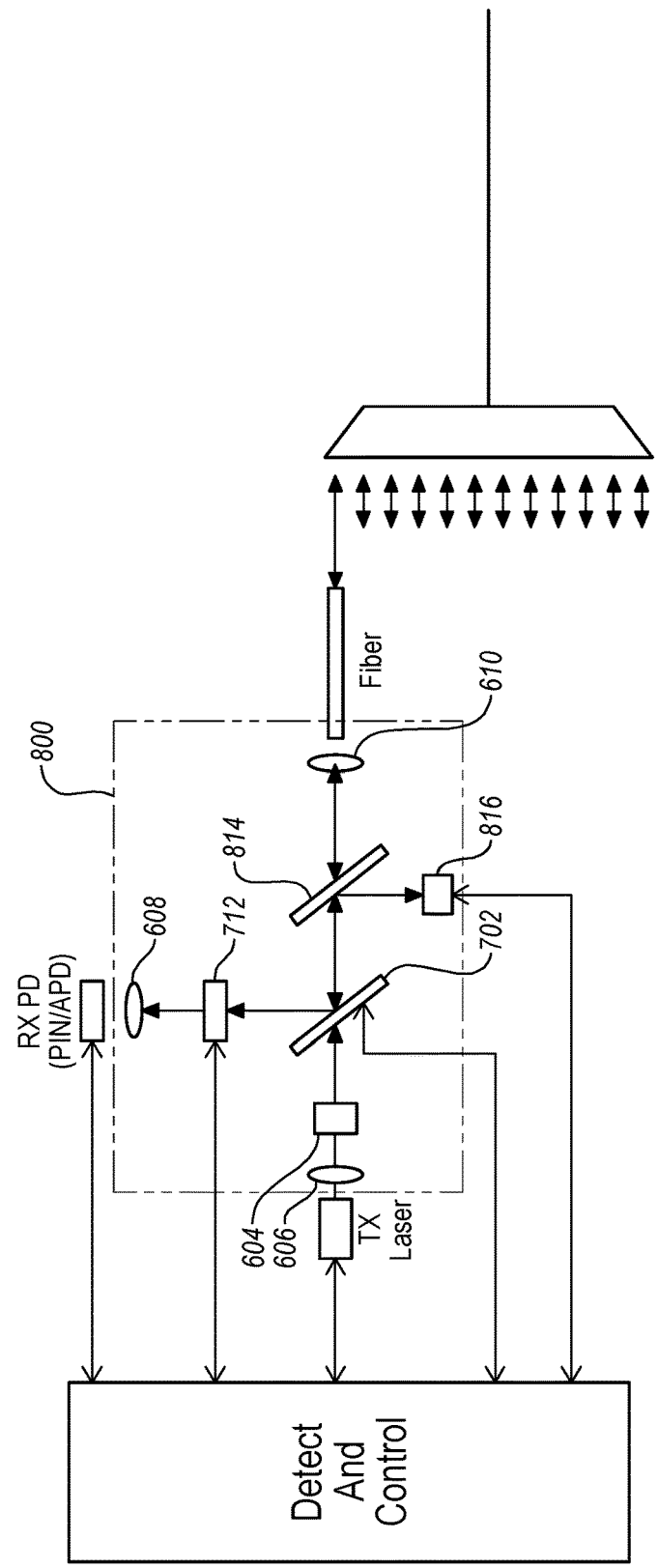
FIG. 8 illustrates another example bi-di mux/demux unit such as may be implemented in the optical communication systems of FIGS. 2 and 3, arranged in accordance with at least one embodiment described herein.
Figure 9:
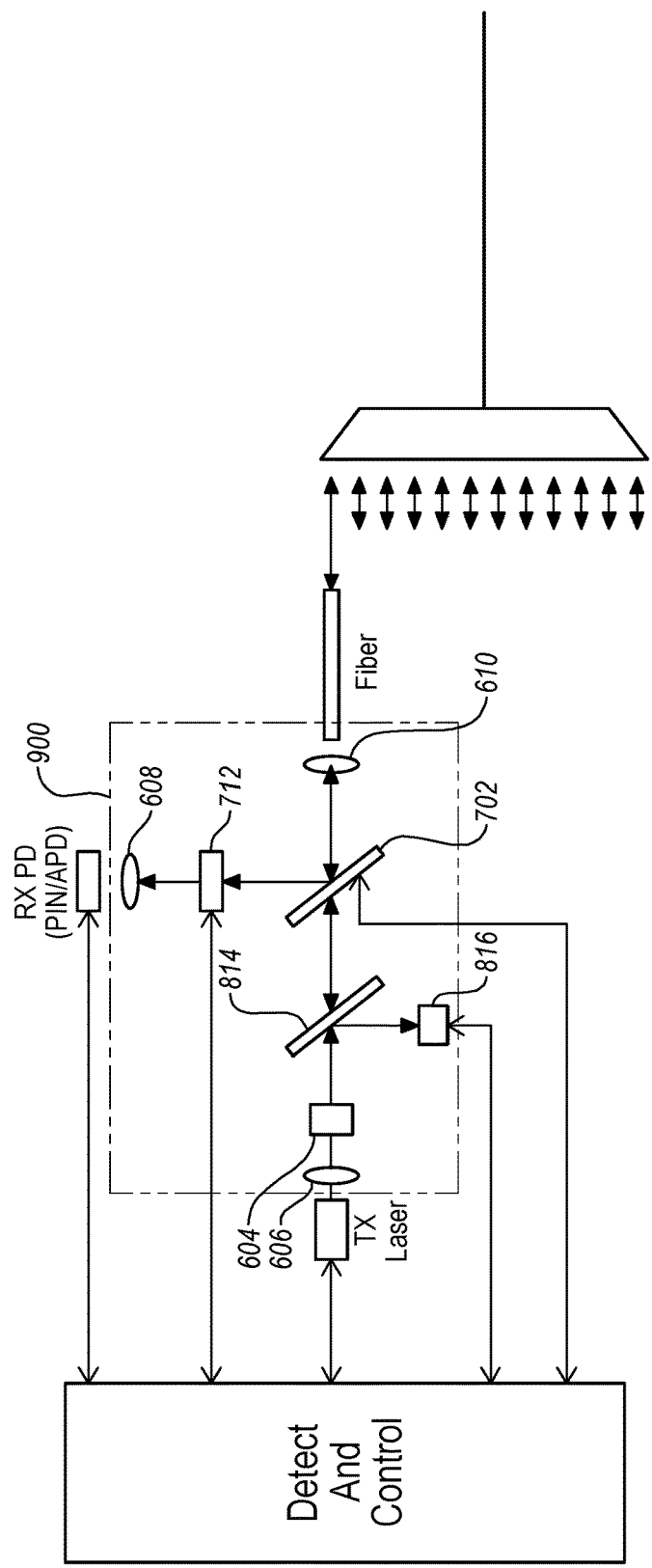
FIG. 9 illustrates another example bi-di mux/demux unit such as may be implemented in the optical communication systems of FIGS. 2 and 3, arranged in accordance with at least one embodiment described herein.

FIGS. 7-9 illustrate three other example bi-di mux/demux units 700, 800, 900 such as may be implemented in the system D, the system 200, the system 300, and/or other systems described herein, arranged in accordance with at least one embodiment described herein. The bi-di mux/demux unit 700 of FIG. 7 includes the same or similar components as the bi-di mux/demux unit 600B of FIG. 6, except that the bi-di mux/demux unit 700 of FIG. 7 includes first and second tunable filters 702, 712 instead of fixed first and second filters 602, 612. The bi-di mux/demux unit 700 of FIG. 7 may be implemented in a communication module with a controller and/or one or more sensors, hereinafter Detect and Control, to tune each of the first and second tunable filters 702, 712 as desired.

The first tunable filter 702 in the bi-di mux/demux unit 700 may have the transmission spectrum 602A or 602B, which transmission spectrum 602A or 602B may be tunable. Similarly, the second tunable filter 712 in the bi-di mux/demux unit 700 may have the transmission spectrum 604A or 604B, which transmission spectrum 604A or 604B may be tunable.

The bi-di mux/demux unit 800 of FIG. 8 includes the same or similar components as the bi-di mux/demux unit 700 of FIG. 7 and additionally includes a tap splitter 814 positioned between the third lens 610 and the first tunable filter 702 and a monitor photodiode (MPD) 816. The tap splitter 814 may be configured to reflect about 5% or some other relatively small amount of the outbound optical signal toward the MPD 816 for monitoring purposes. Similar to the bi-di mux/demux unit 700 of FIG. 7, the bi-di mux/demux unit 800 of FIG. 8 may be implemented in a communication module with Detect and Control.

The bi-di mux/demux unit 900 of FIG. 9 includes the same or similar components as the bi-di mux/demux unit 800 of FIG. 8, although in a slightly different arrangement. In particular, the tap splitter 814 is positioned between the first tunable filter 702 and the optical isolator 604 in the bi-di mux/demux unit 900 of FIG. 9. Similar to the bi-di mux/demux units 700, 800 of FIGS. 7 and 8, the bi-di mux/demux unit 900 of FIG. 9 may be implemented in a communication module with Detect and Control.

The first filter 602, 702 in each of the bi-di mux/demux units 600A, 600B, 700, 800, 900 described herein may include a periodical filter to provide add/drop of one channel in a DWDM channel spacing. In some embodiments, the transmitter included in a corresponding communication module with each bi-di mux/demux unit 600A, 600B, 700, 800, 900 may be tunable so that each communication module may be used for any of the inbound/outbound channel pairs. Thus, any replacement communication modules kept on hand in the event of failure may replace any failed communication module.

As already mentioned, FSR1 and/or FSR2 of the transmission spectra 602A, 602B, 604A, 604B of the first filters 602, 702 and the second filters 612, 712 in the bi-di mux/demux units 600A, 600B, 700, 800, 900 may be 100 GHz, or more generally may be the same as ITU-T channel spacing when the first filters 602, 702 and the second filters 612, 712 include etalon-based fixed wavelength filters. Alternatively, FSR1 and/or and FSR2 may be 1×, 2×, or multiple channel spacing when the first filters 602, 702 and the second filters 612, 712 include tunable filters, provided the tuning range of the first filters 602, 702 and the second filters 612, 712 can cover all DWDM channels considering its periodical nature.

For non-flat-top tunable filter based architecture, one embodiment is to lock the second tunable filter 712 to a remote transmitter so that the power to a local receiver can reach or at least tend toward maximum, while the first tunable filter 702 can lock to the central wavelength of a local transmitter by monitoring the MPD 816 and keep it as maximum, or relatively close to maximum.

Alternatively or additionally, the second tunable filter 712 can be used as an etalon for control of a central wavelength of a remote transmitter by monitoring the power to the local receiver and keep it as maximum, or relatively close to maximum. The peak wavelength of the second tunable filter 712 as an etalon can be set by tuning temperature of the second tunable filter 712 to achieve a target wavelength. In these and other embodiments, the Bi-Di communication modules such as 204 and 206 in FIGS. 2 and 3 at local and remote sites may be capable of having connection with each other. One way to implement the remote control is to use in-band communication channel to exchange wavelength information as defined in ITU-T G.metro. In another embodiment, the first tunable filter 702 can be used as an etalon for control of a central wavelength of the local transmitter by monitoring the MPD 816 and keep it as maximum, or relatively close to maximum. The peak wavelength of the first tunable filter 702 as an etalon can be set by tuning temperature of the first tunable filter 702 to achieve a target wavelength.

For a flat-top tunable filter based architecture, one embodiment is to lock both the first tunable filter 702 and the second tunable filter 712 to a remote transmitter, e.g., by locking the first tunable filter 702 first and by locking the second tunable filter 712 second, so that the power to the local receiver can reach maximum. In the local transmit direction, the first tunable filter 702 may be tuned according to the remote transmitter while the local transmitter output power can keep same due to the flat-top architecture.

Figure 10:
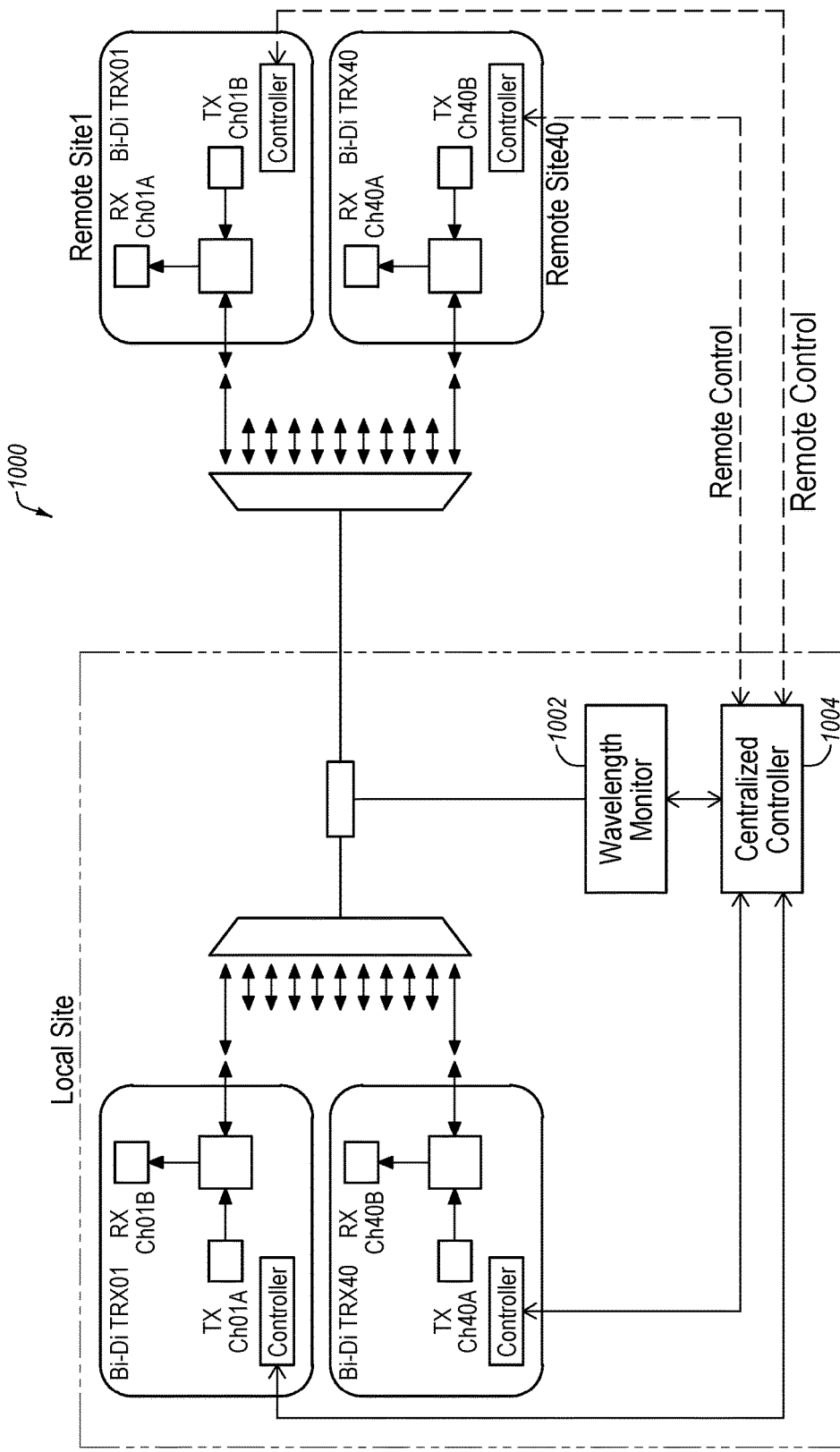
FIG. 10 illustrates another example optical communication system implemented with a remote wavelength control scheme.

One or more embodiments of the tunable Bi-Di architecture described herein can also work together with a remote wavelength control scheme 1000, as illustrated in FIG. 10. A wavelength monitor 1002 monitors wavelength of all remote channels, or monitors all local channels as well. Bi-Di communication modules at remote sites may have a remote connection to a centralized controller 1004. One way to implement the remote control is to use in-band communication channel to exchange wavelength information as defined in ITU-T G.metro. The centralized controller 1004 can communicate with Bi-Di communication modules at both local site and remote site and control wavelength of each Bi-Di communication module according to the wavelength monitor information until achieving a corresponding target wavelength for each Bi-Di communication module. For this scenario, the first tunable filter 702 and/or the second tunable filter 712 may track to the central wavelength of a corresponding transmitter.

Some embodiments described herein include a first filter 602, 702 that is transmissive to an outbound optical signal emitted by a transmitter and that reflects an inbound optical signal toward a receiver. In other embodiments, the first filter 602, 702 may be transmissive to the inbound optical signal and may reflect the outbound optical signal, in which case the positions of the transmitter and the receiver may be switched as compared to the embodiments illustrated in the figures.

Additional details and examples are included in the Appendix filed herewith, which is incorporated herein by reference.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A communication module comprising:
   an optical transmitter configured to emit an outbound optical signal representative of an outbound electrical signal received from a host, the outbound optical signal transmitted into an optical communication system through a module-side port of a multiplexer/demultiplexer of the optical communication system;
   an optical receiver configured to receive an inbound optical signal through the same module-side port of the multiplexer/demultiplexer through which the outbound optical signal is transmitted and to convert the inbound optical signal into an inbound electrical signal to provide to the host, wherein a first frequency of the outbound optical signal transmitted through the module-side port of the multiplexer/demultiplexer is offset from a second frequency of the inbound optical signal received through the module-side port of the multiplexer/demultiplexer by an amount less than a channel spacing of the multiplexer/demultiplexer, the first frequency of the outbound optical signal and the second frequency of the inbound optical signal each aligned to a common transmission peak of a transmission spectrum of the multiplexer/demultiplexer; and
   a periodical filter positioned in an optical path of the outbound optical signal and in an optical path of the inbound optical signal, the periodical filter having a transmission spectrum with periodic transmission peaks and troughs, wherein:
      the first frequency of the outbound optical signal is aligned to one of the transmission peaks and the second frequency of the inbound optical signal is aligned to one of the transmission troughs; or
      the first frequency of the outbound optical signal is aligned to one of the transmission troughs and the second frequency of the inbound optical signal is aligned to one of the transmission peaks.

2. The communication module of claim 1, wherein the periodical filter includes a fixed wavelength filter with fixed periodic transmission peaks and troughs.

3. The communication module of claim 2, wherein the fixed wavelength filter includes an etalon-based fixed wavelength filter.

4. The communication module of claim 1, wherein the periodical filter includes a tunable wavelength filter with tunable periodic transmission peaks and troughs.

5. The communication module of claim 4, wherein the tunable wavelength filter includes an etalon-based tunable wavelength filter.

6. The communication module of claim 5, wherein a peak wavelength of the etalon-based tunable wavelength filter is configured to be set by tuning temperature of the etalon-based tunable wavelength filter to achieve a target wavelength.

7. The communication module of claim 1, wherein the periodical filter includes a tunable filter to provide add/drop of the outbound optical signal and the inbound optical signal within the channel spacing of the multiplexer/demultiplexer.

8. The communication module of claim 1, wherein the optical transmitter includes a tunable transmitter.

9. The communication module of claim 1, further comprising:
   a tap splitter positioned in the optical path of the outbound optical signal to tap a portion of the outbound optical signal to redirect the portion of the outbound optical signal to a monitor optical path;
   a monitor photodiode positioned in the monitor optical path to receive the portion of the outbound optical signal and measure a power of the outbound optical signal; and
   a processor coupled to the optical transmitter, the optical receiver, and the periodical filter and configured to tune the periodical filter, monitor the measured power of the outbound optical signal, and monitor power of the inbound optical signal measured by the optical receiver.

10. The communication module of claim 9, wherein the processor is further configured to adjust, relative to each other, at least one of a central emission wavelength of the optical transmitter or a central wavelength of a transmission peak of the transmission spectrum of the periodical filter to increase the measured power of the outbound optical signal.

11. The communication module of claim 1, wherein:
   the periodical filter comprises a first periodical filter;
   the communication module further comprising a second periodical filter positioned in an optical path of the inbound optical signal between the optical receiver and the first periodical filter; and
   the second periodical filter having a transmission spectrum with periodic transmission peaks and troughs respectively aligned to the periodic transmission troughs and peaks of the transmission spectrum of the first periodical filter.

12. The communication module of claim 11, wherein one or both of the first periodical filter or the second periodical filter is configured to be used to control a central wavelength of the optical transmitter as a local optical transmitter or of a remote optical transmitter that generates the inbound optical signal.

13. The communication module of claim 1, wherein the periodical filter comprises a non-flat top filter.

14. The communication module of claim 1, wherein the periodical filter comprises a flat top filter.

15. A system comprising:
   a local multiplexer/demultiplexer that includes a fiber-side port and a plurality of module-side ports, wherein the fiber-side port is configured to be communicatively coupled to one end of an optical fiber having a remote multiplexer/demultiplexer at an other end of the optical fiber;
   a plurality of local bidirectional communication modules coupled to the plurality of module-side ports of the local multiplexer/demultiplexer, each of the plurality of local bidirectional communication modules configured to:

transmit through a corresponding module-side port of the local multiplexer/demultiplexer a corresponding outbound optical signal on a corresponding channel within a corresponding transmission peak of a transmission spectrum of the local multiplexer-demultiplexer; and receive a corresponding inbound optical signal through the same corresponding module-side port of the local multiplexer-demultiplexer as the corresponding outbound optical signal, the corresponding inbound optical signal received on a different corresponding channel within the same corresponding transmission peak of the transmission spectrum as the corresponding outbound optical signal;

a wavelength monitor communicatively coupled to the optical fiber and configured to monitor wavelengths of at least one of the inbound optical signals or the outbound optical signals; and a centralized controller coupled to the wavelength monitor, the plurality of local bidirectional communication modules, and a plurality of remote bidirectional communication modules coupled to module-side ports of the remote multiplexer/demultiplexer;

wherein the centralized controller, based on wavelength monitor information from the wavelength monitor, is configured to control central wavelengths of at least one of the inbound optical signals or the outbound optical signals; and wherein each of the plurality of local bidirectional communication modules includes a periodical filter positioned in an optical path of the corresponding outbound optical signal and in an optical path of the corresponding inbound optical signal, the periodical filter having a transmission spectrum with periodic transmission peaks and troughs.

16. The system of claim 15, wherein each of the local communication modules includes:

an optical transmitter configured to emit a corresponding one of the outbound optical signals; and an optical receiver configured to receive a corresponding one of the inbound optical signals and to convert the corresponding one of the inbound optical signals into a corresponding inbound electrical signal; wherein a first frequency of the corresponding one of the outbound optical signals is offset from a second frequency of the corresponding one of the inbound optical signals by an amount less than a channel spacing of the local multiplexer/demultiplexer; and wherein:

the first frequency of the corresponding one of the outbound optical signals is aligned to one of the transmission peaks and the second frequency of the corresponding one of the inbound optical signals is aligned to one of the transmission troughs; or the first frequency of the corresponding one of the outbound optical signals is aligned to one of the transmission troughs and the second frequency of the corresponding one of the inbound optical signals is aligned to one of the transmission peaks.

17. The system of claim 16, wherein the periodical filter of each of the local communication modules is configured to track to a central wavelength of the optical transmitter of the corresponding local communication module.

18. The system of claim 17, wherein:

the periodical filter of each of the local communication modules comprises a first periodical filter of the corresponding local communication module;

each of the local communication modules further comprises a second periodical filter positioned in an optical path of the corresponding inbound optical signal between the corresponding optical receiver and the corresponding first periodical filter; and the second periodical filter having a transmission spectrum with periodic transmission peaks and troughs respectively aligned to the periodic transmission troughs and peaks of the transmission spectrum of the corresponding first periodical filter.

19. The system of claim 18, wherein the second periodical filter of each of the local communication modules is configured to track to a central wavelength of an optical transmitter of a corresponding remote communication module that generates the corresponding inbound optical signal.

20. The system of claim 15, wherein:

the local multiplexer/demultiplexer comprises a 100 gigahertz (GHz) multiplexer/demultiplexer;

the plurality of local bidirectional communication modules includes forty local bidirectional communication modules configured to collectively generate forty outbound optical signals, each on a different channel than each other;

the plurality of remote bidirectional communication modules includes forty remote bidirectional communication modules configured to collectively generate forty inbound optical signals, each on a different channel than each other and than the forty outbound optical signals; and the channels of the forty outbound optical signals and the forty inbound optical signals all fall within a wavelength range of the ITU-T C-band from 1530-1565 nanometers.

21. The system of claim 20, wherein:

the local multiplexer/demultiplexer has a spectral port center-to-port center spacing of A GHz; and for each of the local communication modules, the different channels of the corresponding outbound optical signal output from the local communication module and of the corresponding inbound optical signal received at the local communication module are spectrally separated from each other by an amount in a range from 0.3*A GHz and 0.7*A GHz.

22. A system comprising:

a local multiplexer/demultiplexer that includes a fiber-side port and a plurality of module-side ports, wherein the fiber-side port is configured to be communicatively coupled to one end of an optical fiber having a remote multiplexer/demultiplexer at an other end of the optical fiber;

a plurality of local bidirectional communication modules coupled to the plurality of module-side ports of the local multiplexer/demultiplexer, each of the plurality of local bidirectional communication modules configured to:

transmit through a corresponding module-side port of the local multiplexer/demultiplexer a corresponding outbound optical signal on a corresponding outbound channel within a corresponding transmission peak of a transmission spectrum of the local multiplexer-demultiplexer; and receive a corresponding inbound optical signal through the same corresponding module-side port of the local multiplexer-demultiplexer as the corresponding outbound optical signal, the corresponding inbound optical signal received on a corresponding inbound channel within the same corresponding transmission peak of the transmission spectrum as the corresponding outbound optical signal;

wherein the corresponding inbound channel is different than the corresponding outbound channel;

wherein each of the local communication modules includes a periodical filter positioned in an optical path of the corresponding outbound optical signal and in an optical path of the corresponding inbound optical signal, the periodical filter having a transmission spectrum with periodic transmission peaks and troughs; and wherein:
- a first frequency of the corresponding outbound optical signal is aligned to one of the transmission peaks and a second frequency of the corresponding inbound optical signal is aligned to one of the transmission troughs; or
- the first frequency of the corresponding outbound optical signal is aligned to one of the transmission troughs and the second frequency of the corresponding inbound optical signal is aligned to one of the transmission peaks.

* * * * *